March 25, 1958     H. C. HEBERT     2,828,000
APPARATUS FOR GROUPING CONTAINERS IN DIFFERENT
COMBINATIONS FOR TRANSFER TO STACKS
Filed Feb. 19, 1957     2 Sheets-Sheet 2

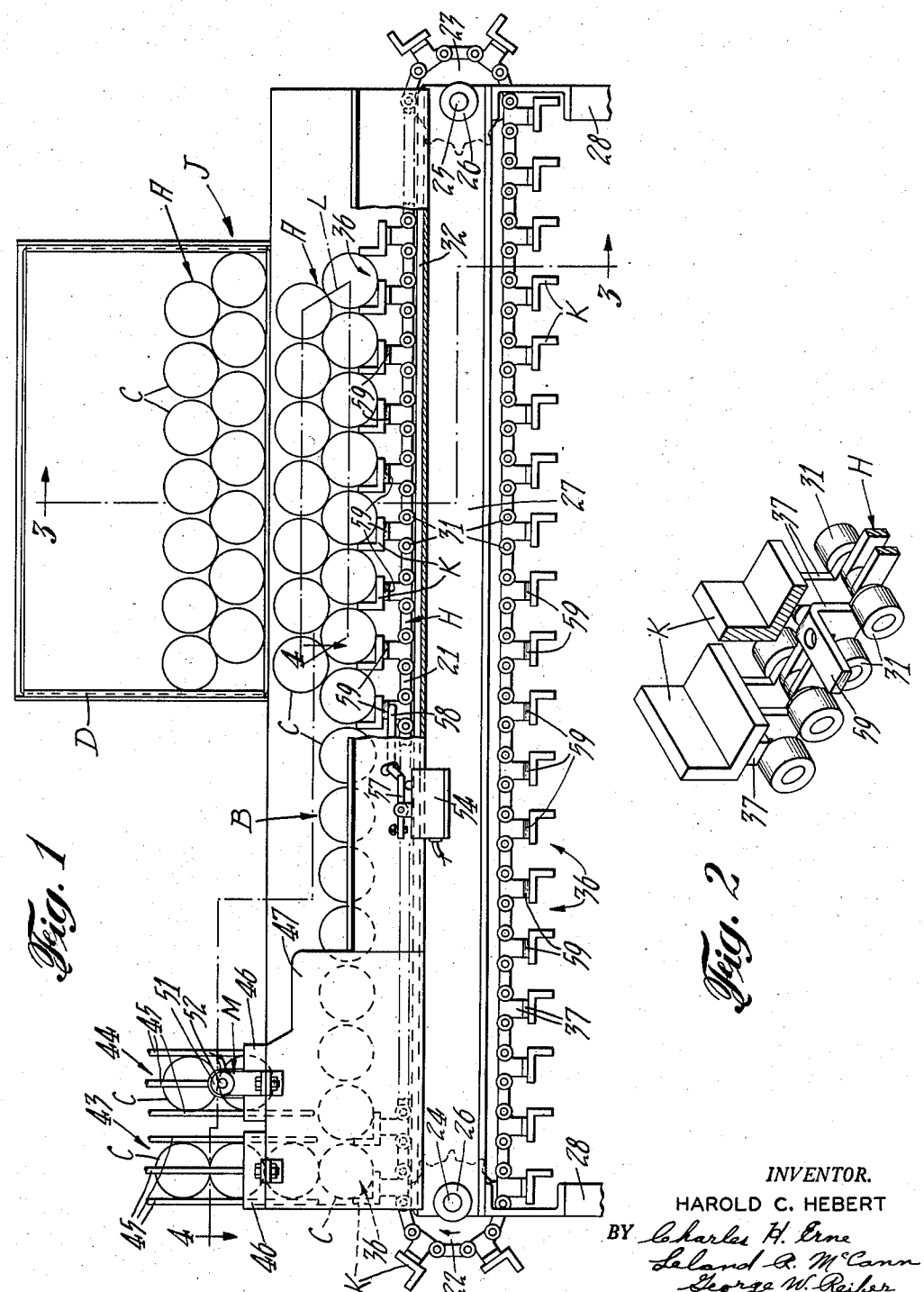

INVENTOR.
HAROLD C. HEBERT
ATTORNEYS

United States Patent Office 2,828,000
Patented Mar. 25, 1958

2,828,000

APPARATUS FOR GROUPING CONTAINERS IN DIFFERENT COMBINATIONS FOR TRANSFER TO STACKS

Harold C. Hebert, Tampa, Fla., assignor to American Can Company, New York, N. Y., a corporation of New Jersey Application February 19, 1957, Serial No. 641,175

6 Claims. (Cl. 198—35)

The present invention relates to the stacking of tubular articles such as cans and containers into shipping boxes and storage bins and the like and has particular reference to devices for grouping the containers into various superimposed row or layer combinations for transfer into the boxes or bins.

This application is a companion to my two following applications filed in the United States Patent Office, Serial Number 641,173 filed February 19, 1957, on Apparatus for Interlocking Flanges of Containers Arranged for Transfer to a Stack, and Serial Number 641,174 filed February 19, 1957, on Apparatus for Grouping Containers for Transfer to Stacks.

In the shipment and storage of empty cans or containers in bulk, the containers usually are stacked in orderly superimposed rows so as to occupy the least space and to facilitate handling during unloading. This stacking of the containers usually is effected manually by an operator having a fork provided with tines arranged to fit into a group of a predetermined number of containers so that he can lift them from a delivery conveyor and place them in stacked formation in the shipping boxes.

An object of the instant invention is the provision of an apparatus for grouping the containers into various superimposed row or layer combinations so that the groups as delivered to the operator for transfer individually into the boxes or bins will total the proper number of vertical rows of containers to fill the box or bin. This is of advantage where the height of the box or bin is such as to accommodate an odd number of rows or layers and a final group of a single row of containers is required to complete the stack in the box or bin.

Another object is the provision of such an apparatus which forms and advances the various superimposed row or layer combination groups in proper consecutive order so as to facilitate rapid and efficient filling of the boxes or bins to capacity.

Numerous other objects and advantages of the invention will be apparent as it is better understood from the following description, which, taken in connection with the accompanying drawings, discloses a preferred embodiment thereof.

Referring to the drawings:

Figure 1 is a side elevation of an apparatus embodying the instant invention, with parts broken away;

Fig. 2 is an enlarged perspective view of a portion of a container conveyor used in the apparatus;

Figure 3:
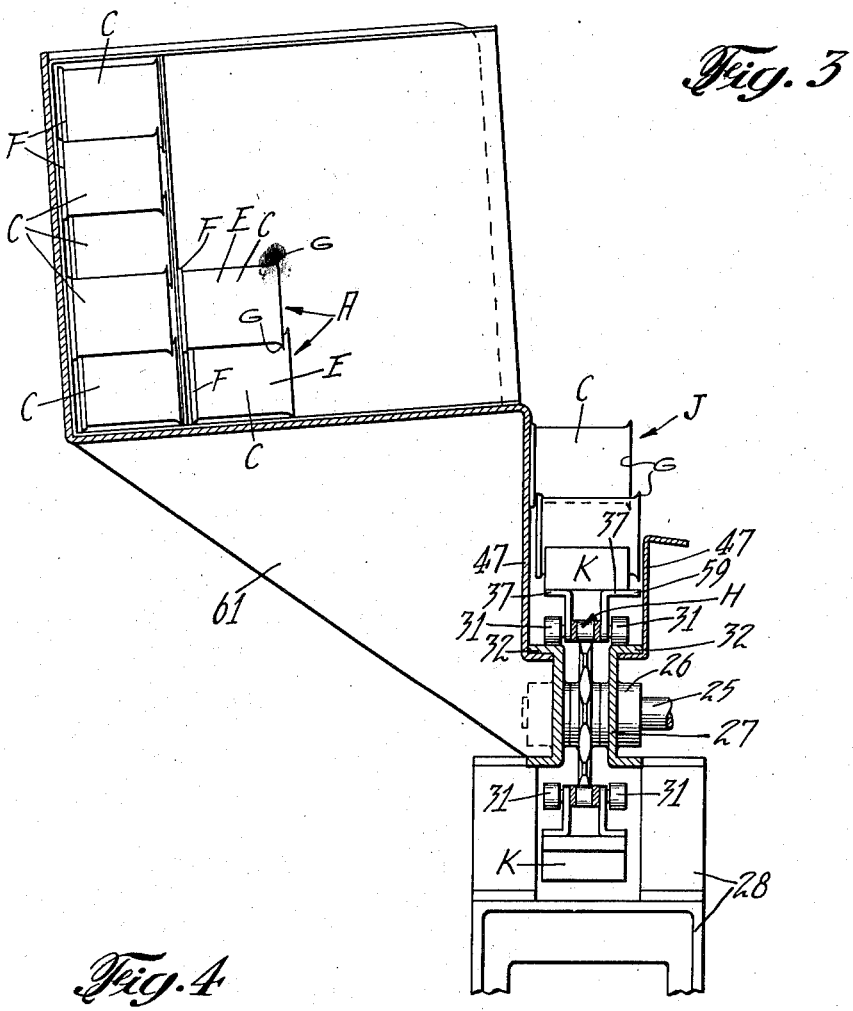
Fig. 3 is an enlarged transverse sectional view taken substantially along the broken line 3—3 in Fig. 1, with parts broken away.

As a preferred or exemplary embodiment of the instant invention the drawings disclose an apparatus for producing superimposed double row groups A and single row groups B of orderly arranged empty cylindrical sheet metal cans or containers C, with the groups A, B presented in proper, desired sequence to an operator at an operator's station for manual stacking into receptacles D such as shipping boxes and storage bins and the like, to thereby facilitate filling the receptacles D to capacity when an odd number of rows or layers of containers are required in the receptacles.

The empty containers C packed in such receptacles D usually are of the type comprising cylindrical bodies E (Figs. 3 and 4) having bottom ends secured in place by suitable end seams F and usually have outwardly projecting flanges G surrounding their top open ends for the reception of covers after filling.

The containers C are received from any suitable source of supply such as the manufacturing lines, or from storage, and are fed in two separate single line, substantially continuous processions, in an on-side or horizontal position, to a horizontal, preferably continuously moving conveyor H which carries them to an operator's station J for transfer into a receptacle D disposed in front of or adjacent the station. The conveyor H is provided with container support or spacer members K spaced along the length of the conveyor at distances substantially equal to the diameter of the containers so as to retain the containers in spaced relation.

The containers C from one of the lines entering the apparatus are fed directly to the support members K on the conveyor and thus form a continuous single line row extending from the entrance end of the apparatus at the left in Fig. 1 to the operator's station. The containers C from the other line entering the apparatus are fed into position on top of the first or lower row to thereby produce a superimposed or double row formation, the containers in the upper row falling into the valleys between the containers in the lower row to produce a staggered relation well known in the art.

As the containers C on the conveyor H advance into the operator's station J, an operator manipulating a double-row, tined fork lifts the containers off the conveyor in groups and transfers them to the receptacle D in stacked order, one group on top of the other until the receptacle is filled. The number of containers in the groups depends upon the dimensions of the receptacle D and, for small receptacles such as the shipping box D shown in the drawings, the fork is designed to pick up in one row a predetermined number of containers to fit the width of the box. In the drawings, for example, the box readily accommodates a row of seven containers. Hence the fork is designed to pick up a double row of seven containers in each row, which group of containers is substantially of rhomboidal formation as indicated by the dot and dash line L (Fig. 1) and constitutes one group A as hereinbefore mentioned.

When the receptacle D has a height dimension which accommodates an odd number of rows or layers to fill it to capacity, several of the double row A groups may be required plus a single row group mentioned hereinbefore as a group B. Thus there is fed to the conveyor H a plurality of the double row groups A in consecutive order to substantially fill the receptacle D and this is immediately followed by a single row B to complete the filling of the receptacle to capacity. It will be understood that the operator may place a single row in the box D first if desired.

For example, the receptacle D shown in the drawings is of a height dimension sufficient to accommodate five superimposed rows of containers composed of two double row A groups and one single row B group. Hence there is formed on the conveyor H, two consecutive groups A and a following group B so that as the operator lifts them off the conveyor in successive order he has sufficient containers to completely fill the receptacle without wasting time in trying to divide one of the A groups to fit the space at the top of the stack. The formation of the B groups at the proper time and in the proper sequence preferably is effected by temporarily stopping the feeding of the containers to the top or superimposed row of containers as will be hereinafter explained more fully.

Referring now to the detailed construction of the apparatus, the conveyor H preferably is a horizontally disposed endless chain 21 which operates over a pair of spaced sprockets 22, 23 mounted on respective shafts 24, 25 journaled in bearings 26 in an elongated frame 27 preferably carried on legs 28. The sprocket shaft 25 preferably is the drive shaft of the conveyor and is rotated preferably continuously in any suitable manner. The upper run of the conveyor chain 21 preferably is supported against sagging to maintain a horizontal position, by a plurality of rollers 31 which are attached to the chain at intervals along its length. These rollers 31 ride along horizontal tracks 32 formed on the frame 27.

The support or spacer members K extend along the entire length of the chain 21. These spacer members K preferably are angle shaped members which are spaced apart a distance substantially equal to the outside diameter of the containers C and which define between them open pockets 36 for the reception of the containers C in the lower row fed to the conveyor H. The spacer members K are secured to lugs 37 (Fig. 2) formed on the chain 21.

The two lines of containers C entering the apparatus are delivered into place on the conveyor H by a pair of adjacently disposed conventional runways having vertical sections 43, 44 (Figs. 1 and 4) constituting outlets which terminate over the top of the conveyor H in spaced relation thereto so as to drop the containers individually from section 43 into the conveyor pockets 36 and from section 44 into the valleys between the first row of containers in the pockets 36. These runway sections 43, 44 preferably are composed of vertically disposed guide rails 45 held in place by surrounding collars 46. The lowermost collar 46 of each runway section preferably is secured to a pair of vertically disposed supporting guide plates 47 which extend up from the frame 27. The guide plates 47 are disposed on opposite sides of the path of travel of the conveyor H and are spaced apart a distance slightly greater than the heights of the containers C so as to keep the containers in line as they advance with the conveyor.

Figure 4:
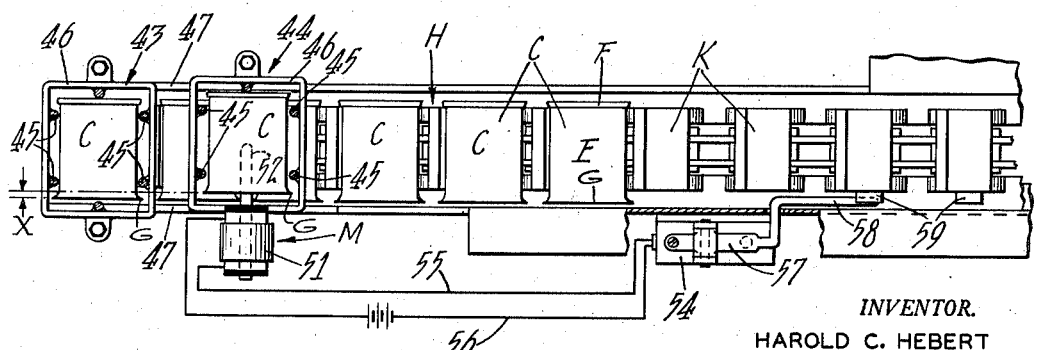
Fig. 4 is an enlarged top plan sectional view taken substantially along the broken line 4—4 in Fig. 1, with parts broken away, the view including a wiring diagram of the electric devices used in the apparatus.

In order to cut off the flow of containers C from the runway section 44 to periodically terminate the feeding of the containers into the top row to produce the single row groups B in the series of groups as mentioned above, the apparatus is provided with a stop device M (Figs. 1 and 4) which is disposed adjacent the runway section 44. This stop device M preferably comprises a normally de-energized electric solenoid 51 having a horizontally disposed elongated movable core 52 which is normally retracted by spring action but which is projectable into the path of travel of the containers in the runway as shown in Figs. 1 and 4, when the solenoid is energized, to hold the containers against discharge from the runway section 44.

Control of the stop device M is effected through a normally open electric switch 54 (Figs. 1 and 4) which is connected to the solenoid 51 by lead wires 55, 56 one of which is also connected to a source of supply of electric current. The switch 54 is provided with a pivoted actuating arm 57 which is rocked in any suitable manner to close and open the switch at the proper time to control the desired formation of the container groups A and B.

A preferred manner of actuating the switch is by way of an extension 58 of the arm 57, which extension projects into the path of travel of a series of extra long projections 59 (Fig. 4) which preferably are formed as integral parts of certain of the container support member lugs 37 of the conveyor H. These lug projections 59 are grouped on the conveyor H in a predetermined pattern which corresponds to the desired sequence of formation of container groups A and B on the conveyor H. When the first lug projection 59 of a group of such projections engages the arm extension 58 and closes the switch 54 the solenoid 51 is energized and the core 52 is projected into the runway section 44 to stop the feeding of containers.

As the conveyor continues to advance, the consecutive lug projections 59 on the conveyor successively engage the arm extension 58. The arm extension 58 is of a length sufficient to span the distance between two consecutive projections 59, and thus the switch 54 is held closed until the last lug projection 59 rides off the arm extension to release it and effect opening of the switch. As this latter action takes place the solenoid 51 is deenergized and the core 52 is retracted from the runway section 44 to release the containers in this section and permit them to fall into place to again produce the double row groups A. In this manner the single row groups B are periodically formed in the series in the proper place to facilitate filling of the receptacles D to capacity at the operator's station J. It will be obvious that each projection will halt the feeding of one can from the runway section 44. Thus, when as in the illustrated embodiment, it is desired to halt the feeding of a specified number of consecutive cans so that a single row group B containing a specified number of cans is formed on the conveyor H, that same number of consecutive projections will be provided.

Where the receptacles D are of comparatively small dimensions they are supported on a bracket 61 (Fig. 3) attached to one of the side plates 47 of the apparatus, at the operator's station J. Where large bins are being filled with containers the apparatus is disposed within reach of the bin and where box cars or trucks are filled the apparatus is located inside the car or truck.

In order to provide for vertical stability of the containers as the groups A, B are piled on top of each other to produce a stack in the receptacles D, it is customary to interlock the flanges G of the containers, i. e. the flanges of the containers in the next above row are set back of the flanges of the containers in the under row so as to prevent the vertical stack from leaning forward and toppling over. Each row may be set back or the groups may be alternated as shown in Fig. 3.

This offsetting of the container flanges G preferably is effected as the containers are delivered to the conveyor H. For this purpose the two container delivery runway sections 43, 44 are offset relative to each other a distance X as shown in Fig. 4 so that the section 44 delivers containers C on top of the lower row of containers in such a relation as to locate the flanges G of the containers in the upper row, in back of the containers in the lower row as shown in Figs. 3 and 4. Thus as the double row groups A of containers are formed, the flanges G of the containers are in the proper position for stacking.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for forming groups of tubular containers for transfer to a stack, comprising a conveyor extending along a path of travel, means for actuating said conveyor, feeding means having a plurality of outlets disposed adjacent the path of travel of said conveyor for feeding a continuous row of containers onto said conveyor and for simultaneously feeding a second row on top of said first row to produce a series of double row groups of containers on said conveyor for transfer to a stack, and stop means disposed adjacent one of said outlets to interrupt the feeding of containers from said outlet to produce a single row group of containers in said series for transfer to said stack.

2. An apparatus of the character defined in claim 1 wherein there is provided means for actuating said stop means in synchronism with said conveyor to locate said single row group of containers in proper position in said series of groups.

3. An apparatus of the character defined in claim 1 wherein said stop means is an electric device.

4. An apparatus of the character defined in claim 1 wherein said stop means is an element projectable into the path of travel of the containers in said outlet.

5. An apparatus of the character defined in claim 1 wherein said stop means is an electric solenoid having a movable core projectable into the path of travel of the containers in said outlet and wherein said solenoid is energized and deenergized through an electric switch actuated through projections on said conveyor and engageable with said switch.

6. An apparatus of the character defined in claim 5 wherein said switch is provided with an actuating arm extending into the path of travel of said projections on said conveyor.

References Cited in the file of this patent

UNITED STATES PATENTS 1,157,017    Lowe _____ Oct. 19, 1915